(12) United States Patent
Colton, Jr. et al.

(10) Patent No.: US 7,533,693 B2
(45) Date of Patent: May 19, 2009

(54) SIDE-MOUNTED POSITION INDICATOR FOR FLAPPER CHECK VALVE

(75) Inventors: G. A. Pete Colton, Jr., Butler, PA (US); Richard R. Schweitzer, Cranberry Township, PA (US)

(73) Assignee: GA Industries, LLC, Cranberry Township, PA (US)

( * ) Notice: Subject to any disclaimer, the term of this patent is extended or adjusted under 35 U.S.C. 154(b) by 0 days.

(21) Appl. No.: 11/263,435

(22) Filed: Oct. 31, 2005

(65) Prior Publication Data

US 2007/0095406 A1    May 3, 2007

(51) Int. Cl.
*F16K 37/00* (2006.01)
*F16K 15/00* (2006.01)
*G01F 1/28* (2006.01)

(52) U.S. Cl. .............. 137/556.3; 137/527; 137/553; 116/277; 73/861.75

(58) Field of Classification Search .......... 137/556.3, 137/527, 553, 554; 251/228; 116/227, 264, 116/266, 271, 282, 303; 73/861.75
See application file for complete search history.

(56) References Cited

U.S. PATENT DOCUMENTS

| 2,371,251 | A | * | 3/1945 | Mauldin | .................. 340/686.4 |
| 3,230,971 | A | * | 1/1966 | Rosaen | ..................... 137/556.3 |
| 3,254,660 | A |   | 6/1966 | Ray | |
| 3,334,858 | A | * | 8/1967 | Hay | .......................... 251/82 |
| 3,789,874 | A | * | 2/1974 | Hills | .......................... 137/527 |
| 4,054,153 | A |   | 10/1977 | Guyton | |
| 4,065,097 | A | * | 12/1977 | Timin | ......................... 251/228 |
| 4,669,500 | A |   | 6/1987 | Strelow | |
| 5,139,048 | A |   | 8/1992 | Armstrong | |
| 5,341,840 | A |   | 8/1994 | Manson et al. | |
| 5,401,396 | A |   | 3/1995 | Lescovich et al. | |
| 5,501,427 | A | * | 3/1996 | Ando | ........................ 251/228 |
| 5,746,246 | A |   | 5/1998 | Yokota et al. | |
| 6,050,294 | A |   | 4/2000 | Makowan | |
| 6,152,173 | A | * | 11/2000 | Makowan | ................. 137/556.3 |

OTHER PUBLICATIONS

APCO; Disk Check Valve; Brochure.
APCO Valve & Primer Corporation; Rubber Flapper Swing Check Valves; Bulletin 100; 2000 Millennium edition; Schaumburg, IL.
Tru-Tech Industries; The Best of the Best; Bulletin 104; Mars, PA.
GA Industries Inc.; The Goldon Advantage; Slide-Chart; 1991; American Slide-Chart Corp.; Wheaton, IL.
GA Industries Inc.; Quiet Closing Swing Check Valves; Bulletin 92-230-1; Cranberry Twp., PA.
GA Industries Inc.; Distributor Products; Catalog DPC-98; Cranberry Twp., PA.

* cited by examiner

*Primary Examiner*—Stephen M. Hepperle
*Assistant Examiner*—Andrew J Rost
(74) *Attorney, Agent, or Firm*—The Webb Law Firm

(57) ABSTRACT

The present invention is a side-mounted position indicator for use with a flapper check valve. The indicator is located outside the valve body and attaches to an internal, cylindrically-shaped roller that allows limited rotation about one axis. This roller has a tripper rod that extends from one side of the roller and has a round, non-marring plastic ball on its opposite end. The ball is held in contact with the valve flapper using a mechanical spring. A separate flush port is provided to allow for periodic internal cleaning without substantial disassembly.

2 Claims, 5 Drawing Sheets

SIDE-MOUNTED POSITION INDICATOR FOR FLAPPER CHECK VALVE

FIELD OF THE INVENTION

The present invention pertains to a side-mounted position indicator for a flapper check valve.

BACKGROUND OF THE INVENTION

It is commonly known to use a check valve with a closure mechanism consisting of a disc that pivots within the valve body. Check valves are designed to stop flow reversals within a piping system. The disc closure mechanism typically pivots about a hinge that is fully contained in the valve body. Such check valves are disclosed in U.S. Pat. No. 4,054,153 and U.S. Pat. No. 5,341,840.

It has also been commonly known to use an indicator mechanism to show the check valve disc position. Users of check valves desire to verify the position of the valve (open or closed), because lack of flow could indicate a serious condition in the pipeline. Thus, it has been known to attach an indicator mechanism to the pivot point of the disc such that the disc position, i.e. open or closed, can be observed by an external indicator dial. U.S. Pat. No. 5,746,246 discloses this type of indicator. It is also known to check on the position of a check valve using an inductive type proximity switch that is mounted on the valve body with its target mounted internally on the flapper. The target transmits an electric signal indicating when the flapper is open or closed.

Prior position indicators of these types are expensive and complicated, however. As a result, there has been a need to develop a check valve position indicator that has a more simple design. One such design is shown in U.S. Pat. No. 6,152,173. This design includes an indicator assembly comprised of a threaded plug inserted into a threaded hole or threaded box on top of the valve cover, an indicating bracket, and a rod assembly including a rod or rods that extend in both directions from the plug and which moves in relation to the valve disc and is held in the threaded plug by a pivotable spherical element or ball. In operation, the inwardly extending end of the rod is held by a tension spring against the check valve disc. The outwardly extending end of the rod protrudes from the valve cover and terminates near a top end of an indicating plate. When flow develops in the pipeline, the valve disc lifts up and the rod, in turn, is forced to lift via contact with the disc. The outwardly extending end of the rod then pivots downward to show that the valve is "open" by reference to the indicating plate. While the rod is in motion, it is held from translating by the pivotable ball contained in the threaded plug. The ball rotates against non-metallic seals in the plug. While this design addresses the need for a simple position indicator it has several disadvantages. First, because the indicator assembly uses a rod that protrudes from the top of the valve, this design precludes the use of an upper clean-out port. Further, the indicator assembly must be restrained against lateral movement because the pivotable ball can move laterally. Finally, the indicator is not adjustable.

The present invention addresses these disadvantages in the prior art design by providing for a side-mounted valve position indicator

BRIEF SUMMARY OF THE INVENTION

The present invention provides a simple check valve position indicator that is mounted on the side of a valve. This design allows for an upper clean-out port as well as an adjustable position indicator. The position indicator of the present invention threads into an existing pipe tap located at the top of a valve assembly. The invention preferably includes a bushing which houses a round roller with O-ring seals to prevent leakage or pressure loss from within the valve. A channel bracket including a threaded clean-out port is attached to the bushing. A tripper rod is attached to the bottom of the roller and is positioned within the valve body to touch the valve flapper. A visual position flag or other indicator device or assembly is attached to the side of the roller. For example, an electrical switch may also be added to the exterior indicator assembly for transmitting an "open" or "closed" signal back to a control device. In one embodiment, a mechanical spring is attached to the visual flag and channel bracket. This spring holds the tripper rod and plastic ball firmly against the valve body flapper. When no flow is present in the valve, the spring tension aids in positioning the valve flapper in a closed position, and the position flag or other indicator visually shows this "closed" position on the channel bracket. When flow develops in the valve, the flapper lifts upward toward the valve cover. This lift also raises the tripper rod and causes the roller to rotate. The position flag or other indicator attached to the side of the roller, in turn, moves to visually show an "open" position for the valve on the channel bracket.

BRIEF DESCRIPTION OF THE DRAWINGS

For the present invention to be easily understood and readily practiced, the invention will now be described, for the purposes of illustration and not limitation, in conjunction with the following figures, wherein.

Figure 1:
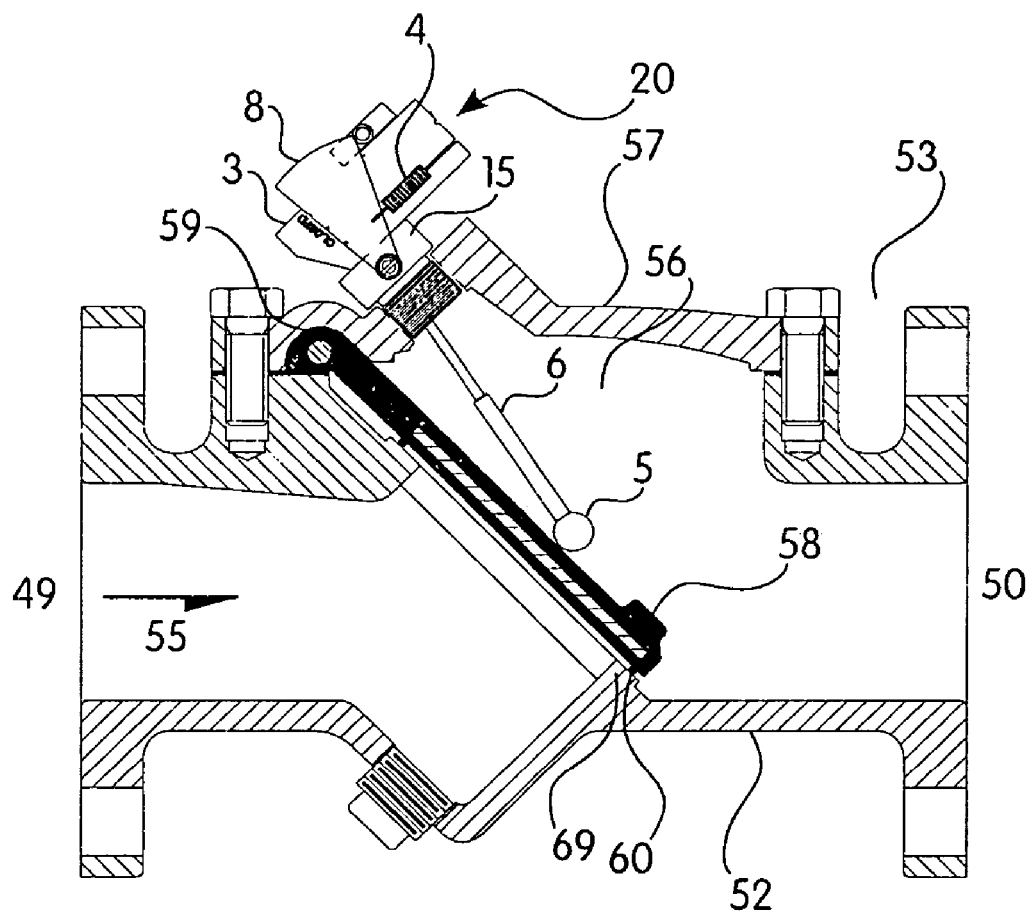
FIG. 1 is a sectional view showing a fully assembled valve position indicator installed in a flapper check valve.

While the invention is amenable to various modifications and alternative forms, specific embodiments have been shown by way of example only in the drawings and will be described in detail. It should be understood, however, that the intention is not to limit the invention to the particular embodiments described. On the contrary, the intention is to cover all modifications, equivalents, and alternatives following within the spirit and scope of the invention as defined by the appended claims.

DETAILED DESCRIPTION OF THE INVENTION

Figure 2:
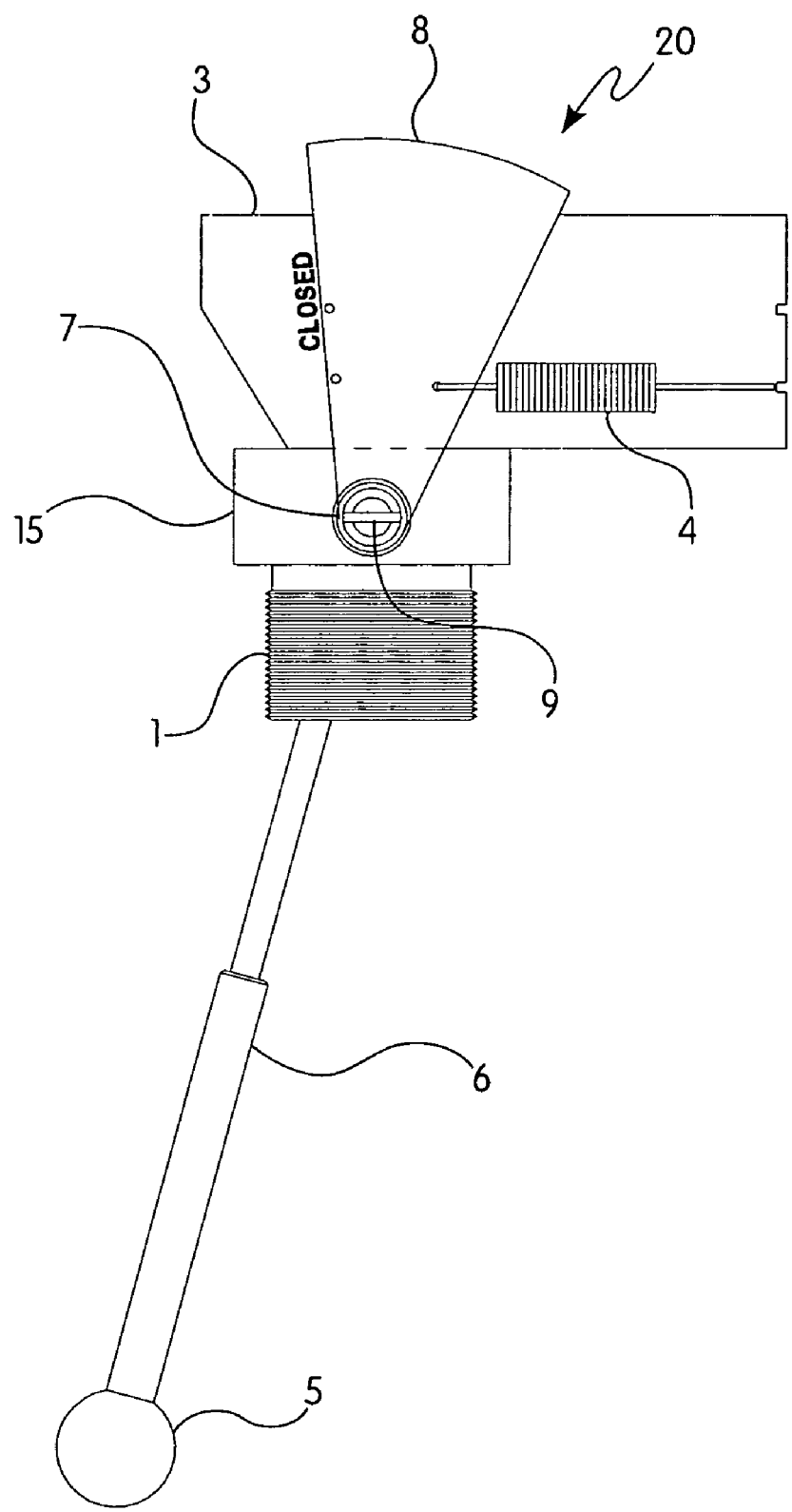
FIG. 2 is a larger outside view of the valve position indicator.

Referring to FIGS. 1 and 2, the position indicator (20) of the present invention is designed for use with a flapper swing check valve assembly (53) with a valve body (52) that includes an inlet (49) and outlet (50). The media flow path is indicated by a flow arrow (55). The valve body (52) has a top opening (56) which is enclosed by a cover (57). The valve body (52) also houses a flapper (58). This flapper (58) includes a hinged attachment (59) to the valve body (52), which allows the flapper (58) to rotate between open and closed positions within the valve body (52). The flapper (58) is normally in the closed position, as shown in FIG. 1, when no media flow is present in the valve body (52). This flapper (58), when in the closed position, rests against a metal seating area (69). The flapper (58) can incorporate a sealing bead (60), or other sealing mechanism, that insures drop tight sealing under pressure.

Figure 3:
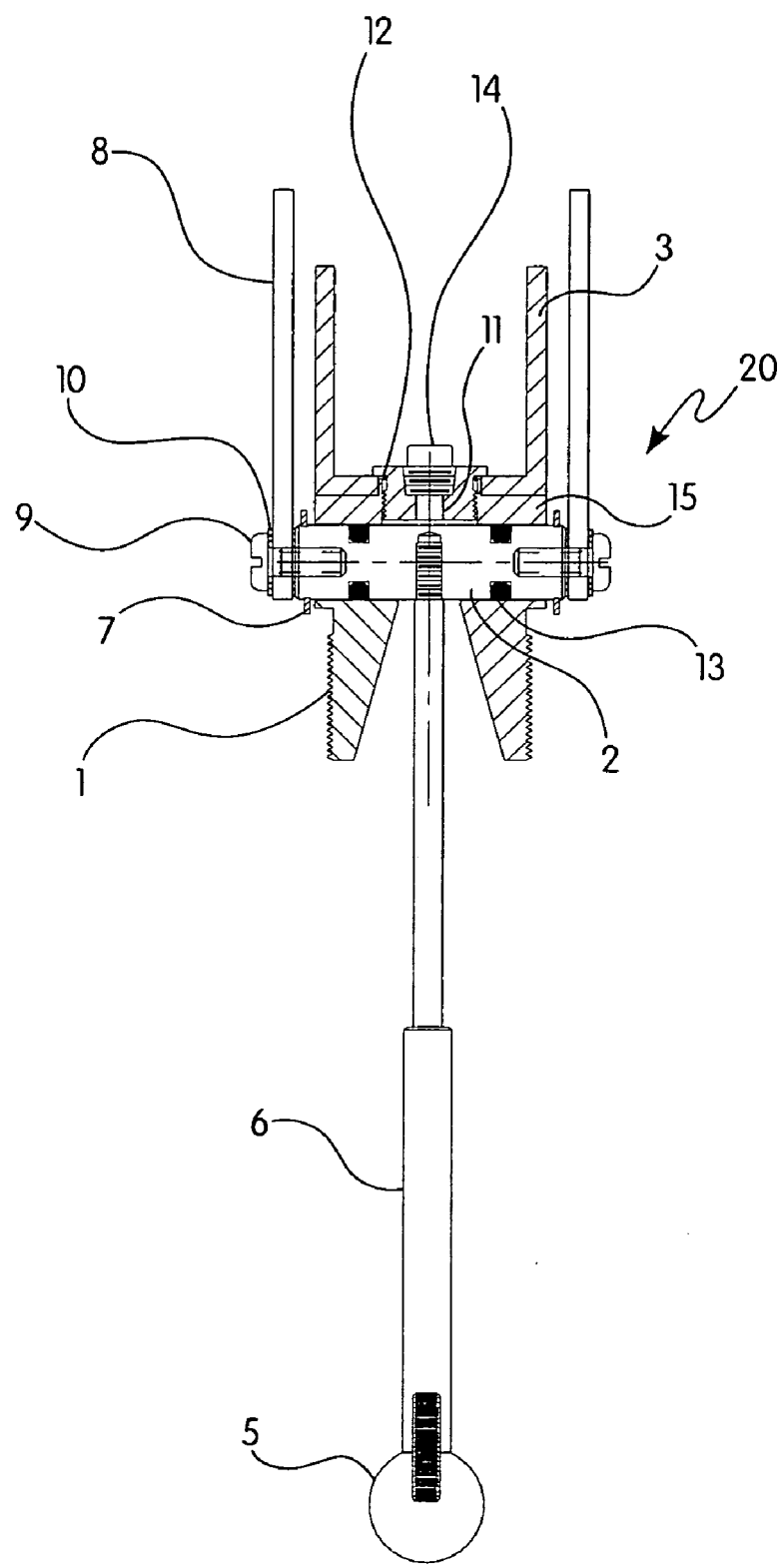
FIG. 3 is a side sectional view of the valve position indicator rotated 90 degrees from FIG. 2.

Referring more specifically to FIGS. 1, 2 and 3, the preferred embodiment of the present invention provides a position indicator (20) that preferably attaches by threaded plug or bushing (01) into a like threaded hole on top of the valve cover (57). Other attachments mechanisms may also be used. The position indicator (20) further comprises: (i) a bracket assembly (15) that is attached to plug (01) and straddles the opening in the top of valve cover (57) or body, (ii) a roller (02) that is rotationally mounted within the bracket assembly (15), (iii) a rod (06) attached to the bottom of the roller (02) that extends into the valve body (52) so as to contact the flapper (58), and (iv) an exterior position indicator (08) that is mounted on at least one side of bracket assembly (15) and interacts by connecting the corresponding end of roller (02) to indicate the position of flapper (58) as roller (02) rotates. Each interactive roller (02) end can extend from the side of the valve body (52), as shown in FIG. 3, or can be exposed to exterior position indicator (08) inside the bracket assembly (15).

Figure 4:
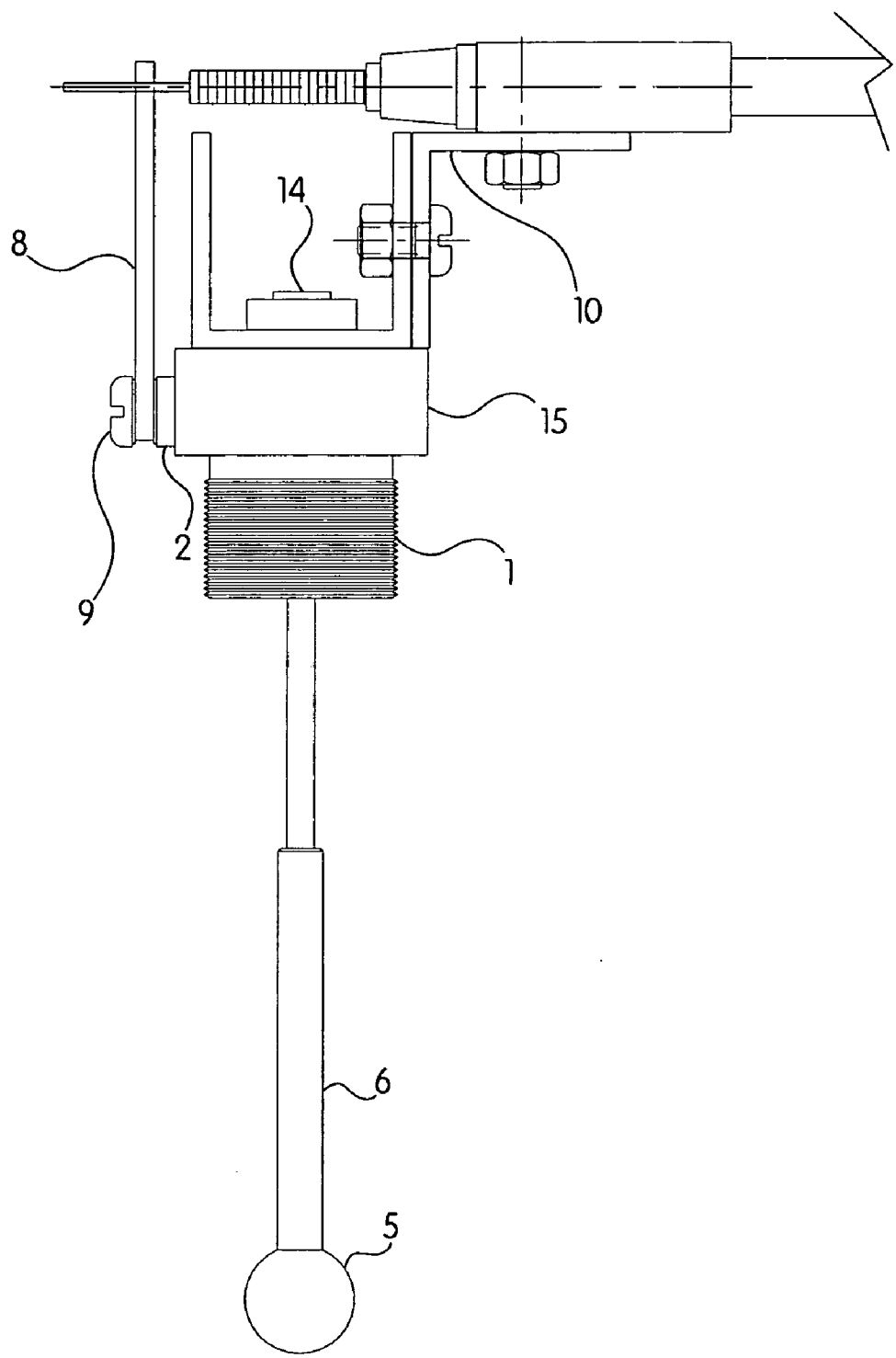
FIG. 4 is a side enlarged view showing the optional limit switch device.
Figure 5:
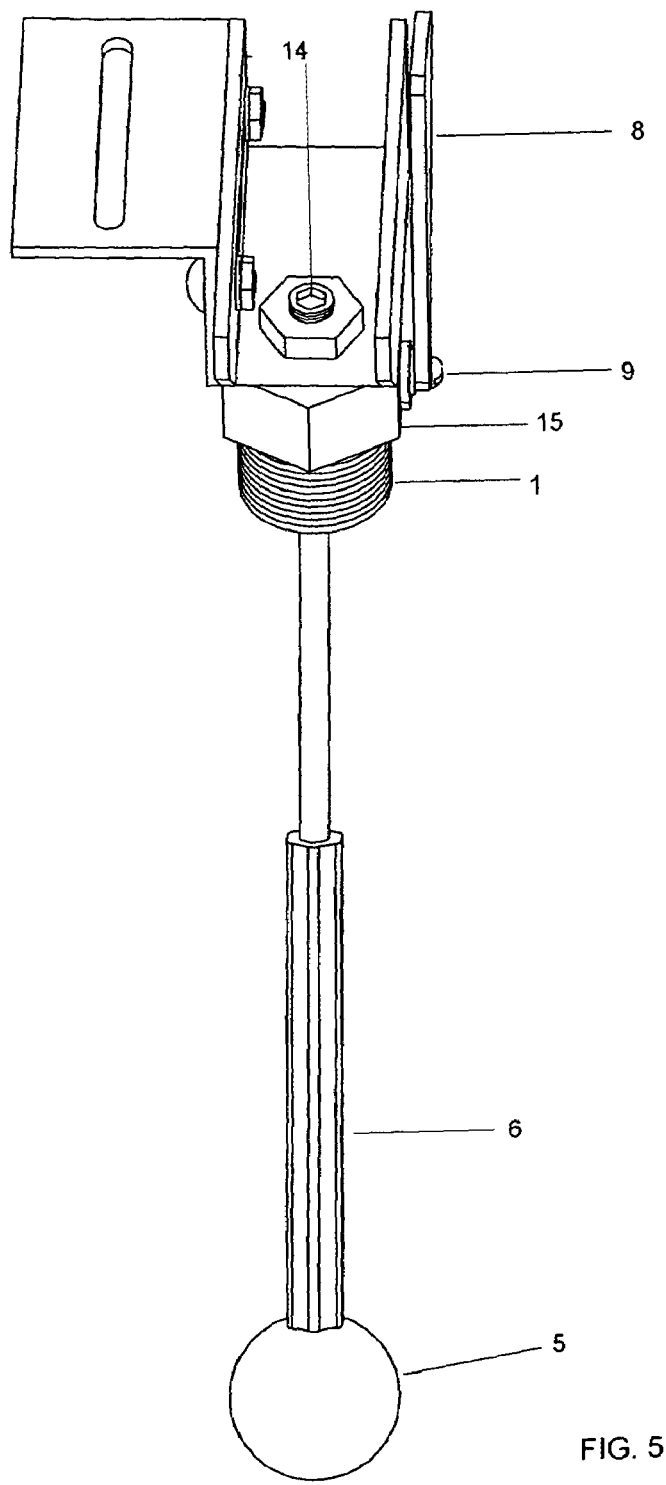
FIG. 5 is a top perspective view of the valve position indicator showing access to the clean out port.

And now with reference to FIGS. 4 and 5, in a preferred embodiment, the bracket assembly (15) further includes a clean-out port (11), as well at least one side wall (03) that interacts with the exterior position indicator (08) to indicate whether the valve is open or closed. More specifically, the clean-out port (11) is a tapped opening at the top of the bracket assembly (15). A stopper (14) seals the clean-out port (11). The stopper (14) is preferably threaded and engages threading within the clean-out port (11).

Side wall (03) preferably contains markings or wording that corresponds to the position of the exterior position indicator (08) to indicate an "open" or "closed" valve position. In an alternative embodiment, two side walls (03) can be used so that the position of the flapper (58) can be ascertained from viewing either side of valve assembly (53). Also, in an alternative embodiment, a spring (04) may be employed to create tension against the exterior position indicator (08) and force it and, by interaction through the roller (02) and the rod (06), the flapper (58) to a closed position. Preferably, the exterior position indicator (08) is a fully adjustable indicator flag. In particular, the exterior position indicator (08) and the side wall (03) can have different insertion holes (16) and slots (17) for use in connection with the spring (04), which, in turn, allow the exterior position indicator (08) to adapt to the closed position of the internal flapper. Related adjustment of the exterior position indicator (08) can be made at its point of connection to the roller (02), and, more specifically, loosening of the attachment mechanism (09).

In an alternative embodiment of the present invention, the exterior position indicator (08) can employ other position indicators, including both mechanical and electronic indicators. For example, in an alternative embodiment of the present invention, a common electrical switch may also be added by bracketry to the bracket assembly (15) to interact with the roller (02) where it extends outward from the bracket assembly (15) to detect the position of the flapper (58) and to transmit a corresponding signal back to a control device. FIG. 4 illustrates one embodiment of the present invention that utilizes an electrical position indicator. FIG. 4 illustrates the exterior side view of the position indicator assembly (20) with a mountable limit switch. The roller (02) trips the sensing whisker on the limit switch. This, in turn, sends a signal to a remote control panel to indicate that the flapper (58) is in the open or closed position.

Referring to FIGS. 1, 2, and 3, in preferred embodiments of the rod and roller elements of the present invention, the roller (02) is sealed, preferably with O-ring seals (13), so as to prevent fluid within the valve from leaking outside the valve body at the surface of roller (02). A plastic ball (05) is preferably attached to the bottom end of rod (06) to engage the flapper (58). The ball (05) can also be comprised of other materials. For example, if gravity alone is used to hold the ball (05) against the flapper (58) and help force the flapper (58) to a closed position in the absence of flow (55), the ball (05) can be comprised of a heavier material. The roller (02) provides for a low friction rotation with higher pressure at the point of contact with the roller O-rings (13) than in prior art designs using a ball pivot mechanism. Such higher pressure makes the O-rings (13) function more efficiently.

In operation, flow within valve body (52) causes the flapper (58) to pivot upward. Such movement, in turn, lifts rod (06) and causes roller (02) to rotate such that position indicator (08) also rotates to indicate an "open" position on side wall (03). Ball (05) helps rod (06) move smoothly against flapper (58) during such movement.

When flow ceases, the flapper (58) closes and the spring (04) causes the position indicator (08) to return to a closed position. In contrast to the pivot ball of prior art designs, the roller (02) holds the rod (06) and the ball (05) at the end of the tripper rod (06) in a rigid position, i.e. the rod (06) to the roller (02) such that the rod (06) cannot move from side to side.

As shown in FIGS. 2 and 3, in the preferred embodiment of the present invention a retaining ring (07) may be used on each side to hold the roller (02) from shifting inside the bushing (01) as the flapper (58) opens and closes.

In the preferred embodiment of the present invention, a lockwasher (10) may be used to keep the exterior position indicator (08) from slipping as a result of the spring (04) tension when the flapper (58) is opening and closing.

When flow enters the valve body (52) the flapper (58) begins to move upward, which in turn contacts the ball (05) on the tripper rod (06), which turns the roller (02) and rotates the exterior position indicator (08) to the open position.

In a preferred embodiment of the present invention, the bushing (01) is made of bronze (alloy 360). The roller (02), rod (06), retaining ring (07), position indicator (08), attachment mechanism (09), lockwasher (10), and clean out port (11) are made of 303 stainless steel. The side wall (03) is made of epoxy-coated aluminum and the spring (04) is stainless steel. The ball (05) is delrin and the O-rings (12, 13) are Buna-N. These materials comprise the preferred embodiment of the present invention, but it will be obvious to those skilled in the art that the components of this invention may be comprised of an almost infinite combination of various materials that will function and serve the various purposes of the present invention. All such variations are included in the invention.

The above-provided discussion of various embodiments of the present invention is intended to be an illustrative, but not exhaustive, list of possible embodiments. For example, the position indicator may attach to a valve's opening that is located elsewhere than at the top of a valve body. It will be obvious to one skilled in the art that other embodiments are possible and are included within the scope of this invention.

The invention claimed is:

1. A valve position indicator for use with a flapper swing check valve assembly, said check valve assembly having a valve body with an inlet and outlet, an opening in said valve body, and a flapper that hingeably attaches to the inside of said valve body so as to allow said flapper to swing between an open and a closed position within said valve body, said position indicator comprising:

- a bracket assembly that attaches to and sits over said opening in said valve body;
- a roller that is rotationally mounted within said bracket assembly and that has one axis of rotation, wherein at least one end of said roller extends outward from the corresponding side of said bracket assembly;
- a rod that is attached to said roller and extends into said valve body so as to contact said flapper and cause said roller to rotate when said flapper swings between open and closed positions; and
- an exterior position indicator that is mounted on said at least one outwardly extending end of said roller to indicate the position of said flapper as said roller rotates,
- wherein said exterior position indicator comprises at least one indicator flag attached to an end of said roller and a corresponding side wall bearing a visual indicator of the position of said flapper,
- wherein said closed position of said indicator flag can be adjusted to correspond to check valves having a different closed position for said flapper, and
- wherein said closed position of said indicator flag can be adjusted through use of a spring mechanism attached to varying insertion holes in said indicator flag and varying insertion slots in said bracket assembly.

2. A valve position indicator for use with a flapper swing check valve assembly, said check valve assembly having a valve body with an inlet and outlet, an opening in said valve body, and a flapper that hingeably attaches to the inside of said valve body so as to allow said flapper to swing between an open and a closed position within said valve body, said position indicator comprising:

- a bracket assembly that attaches to and sits over said opening in said valve body;
- a roller that is rotationally mounted within said bracket assembly and that has one axis of rotation, wherein at least one end of said roller extends outward from the corresponding side of said bracket assembly;
- a rod that is attached to said roller and extends into said valve body so as to contact said flapper and cause said roller to rotate when said flapper swings between open and closed positions; and
- an exterior position indicator that is mounted on said at least one outwardly extending end of said roller to indicate the position of said flapper as said roller rotates,
- wherein said exterior position indicator comprises at least one indicator flag attached to an end of said roller and a corresponding side wall bearing a visual indicator of the position of said flapper,
- wherein said closed position of said indicator flag can be adjusted to correspond to check valves having a different closed position for said flapper, and
- wherein said closed position of said indicator flag can be adjusted through use of a releasable attachment mechanism that attaches said indicator flag to the end of said roller.

* * * * *